(12) United States Patent
Karwowski

(10) Patent No.: US 7,356,941 B2
(45) Date of Patent: Apr. 15, 2008

(54) MICROMETER SUPPORT APPARATUS AND MEASUREMENT METHOD USING SAME

(75) Inventor: Francis Ignatius Karwowski, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 11/441,285

(22) Filed: May 25, 2006

(65) Prior Publication Data

US 2007/0271807 A1 Nov. 29, 2007

(51) Int. Cl.
*G01B 3/18* (2006.01)
(52) U.S. Cl. .......................................... 33/828; 33/832
(58) Field of Classification Search .................. 33/572, 33/573, 828, 831, 832, 833; 248/229.1; 269/290, 269/294
See application file for complete search history.

(56) References Cited

U.S. PATENT DOCUMENTS

| | | | |
|---|---|---|---|
| 2,821,022 A * | 1/1958 | Woodward | 33/567.1 |
| 3,813,789 A | 6/1974 | Shelton | |
| 3,863,351 A | 2/1975 | Kalen | |
| 4,136,457 A * | 1/1979 | Langer | 33/828 |
| 4,509,265 A | 4/1985 | Donaldson | |
| 4,986,323 A | 1/1991 | Lemaire, Jr. | |
| 5,353,516 A * | 10/1994 | Dalton | 33/833 |
| 5,383,286 A | 1/1995 | Kipnes | |
| 5,829,155 A | 11/1998 | Takahashi et al. | |
| 6,219,932 B1 | 4/2001 | Whitemore | |
| 6,260,286 B1 | 7/2001 | Suzuki et al. | |
| 6,354,014 B1 | 3/2002 | Yamakawa et al. | |
| 6,467,752 B2 * | 10/2002 | Woods | 251/148 |
| 6,820,347 B2 | 11/2004 | Mellander | |
| 7,111,413 B2 | 9/2006 | Seibold | |
| 2002/0073788 A1 * | 6/2002 | Hatley et al. | 73/866.5 |
| 2007/0063114 A1 * | 3/2007 | Brumbaugh | 248/226.11 |

* cited by examiner

*Primary Examiner*—G. Bradley Bennett
(74) *Attorney, Agent, or Firm*—Armstrong Teasdale LLP

(57) ABSTRACT

A method for measuring a distance with a pin micrometer includes attaching a pin micrometer support to a flange at a predetermined location on the flange in a first channel, supporting a pin micrometer in a stationary position in a second channel, and extending a measurement rod of the pin micrometer to a location to which the distance is to be measured.

17 Claims, 5 Drawing Sheets

MICROMETER SUPPORT APPARATUS AND MEASUREMENT METHOD USING SAME

BACKGROUND OF THE INVENTION

This invention relates generally to the measuring of small parts, and more particularly, to methods and apparatus for making consistent and accurate measurements in difficult to reach locations.

In the assembly of industrial parts such as turbines, it was found that assemblers have difficulty in accurately measuring some distances. In one instance, an assembler had to crawl into a turbine unit to hold the end of a pin micrometer in place on a chalk line placed on a diaphragm and measure the distance to a casing joint, which has a vertical wire strung on it. Simultaneously, the assembler had to turn the barrel of the micrometer to get the distance reading. It was found that the micrometer moved on the diaphragm, causing the readings to change and become inconsistent.

BRIEF DESCRIPTION OF THE INVENTION

Therefore, in one aspect, some configurations of the present invention provide a support for a pin micrometer. The support includes a guide body having a first channel configured to attach to a flange at a predetermined measuring location and having a surface configured to rest against the flange. The support also includes a second channel having a surface configured to support a pin micrometer in a stationary position to measure essentially perpendicular distances from the flange at the predetermined measuring location.

In another aspect, some configurations of the present invention provide a method for measuring a distance with a pin micrometer. The method includes attaching a pin micrometer support to a flange at a predetermined location on the flange in a first channel, supporting a pin micrometer in a stationary position in a second channel, and extending a measurement rod of the pin micrometer to a location to which the distance is to be measured.

It will be appreciated that some configurations of the present invention require only one hand to support a pin micrometer at a marked position of a flange. Furthermore, it has been determined that measurements made using method configurations of the present invention are more repeatable than those obtained using prior art methods.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features.

Moreover, unless explicitly stated to the contrary, embodiments "comprising" or "having" an element or a plurality of elements having a particular property may include additional such elements not having that property.

Figure 1:
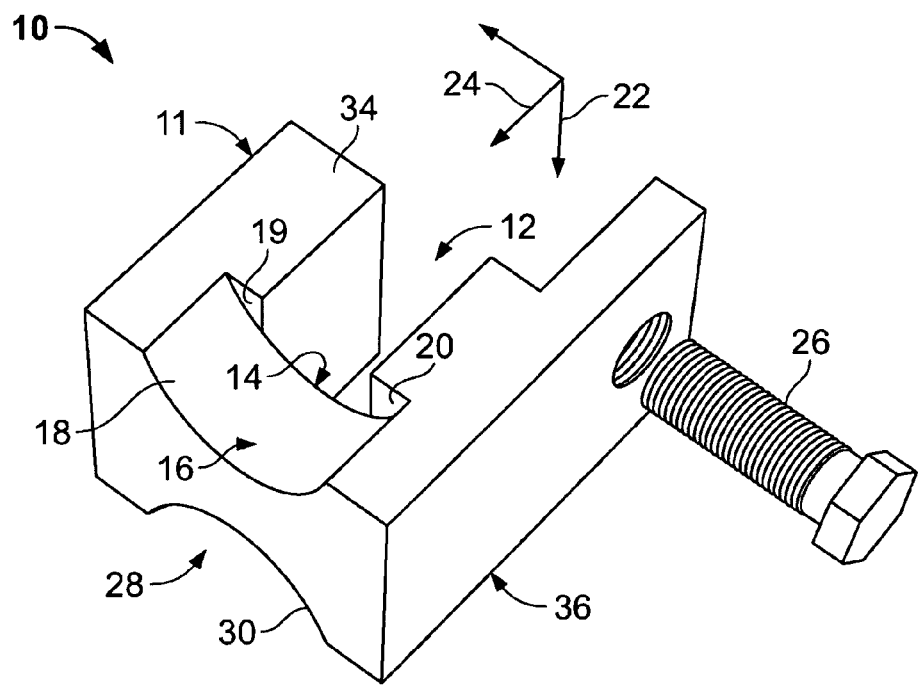
FIG. 1 is a perspective view of a support configuration of the present invention from a first angle.
Figure 2:
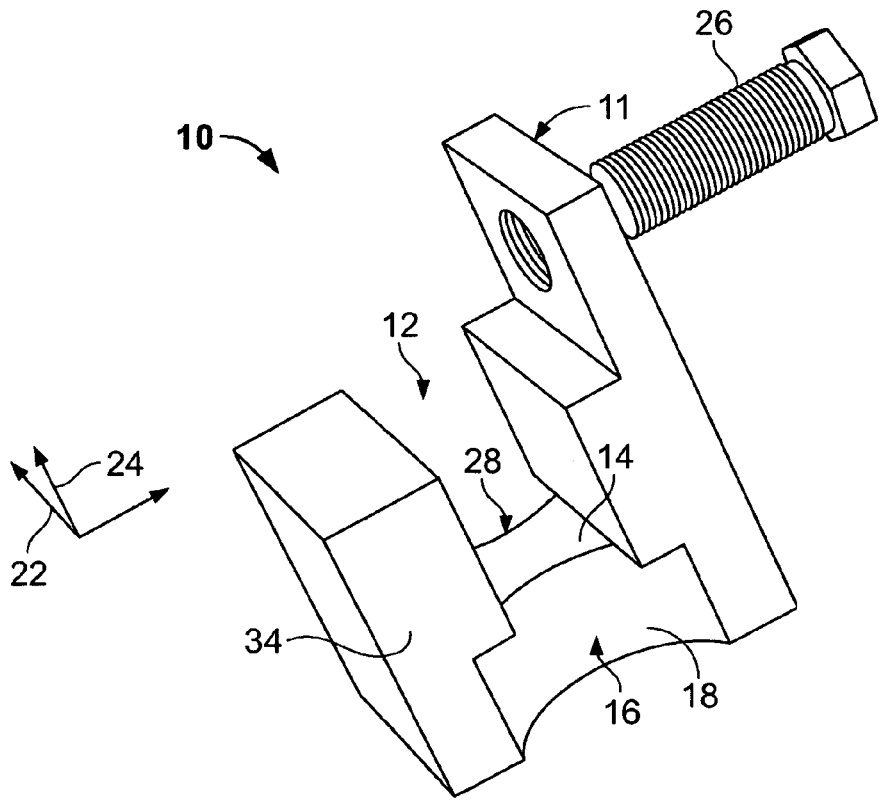
FIG. 2 is a perspective view of the support configuration of FIG. 1 from a second, different angle.
Figure 3:
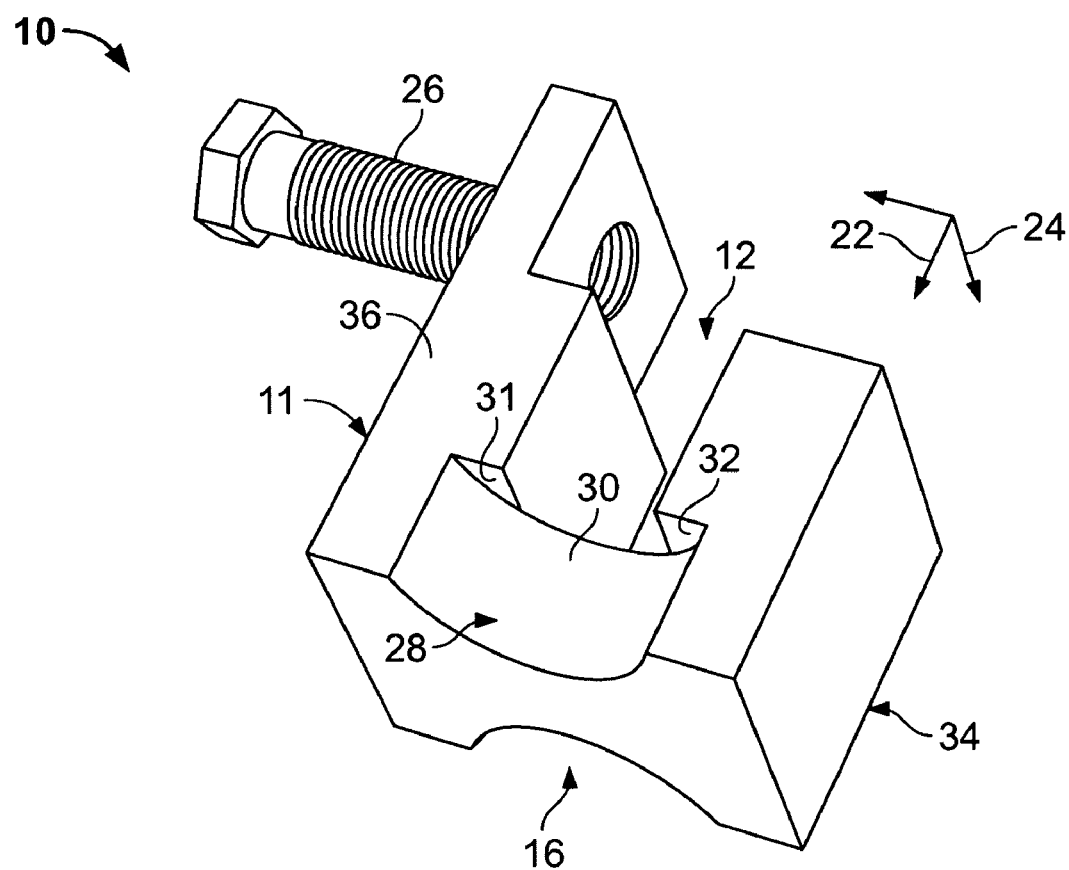
FIG. 3 is a perspective view of the support configuration of FIG. 1 and FIG. 2 from a third, different angle.

In some configurations of the present invention and referring to the perspective views of FIGS. 1, 2, and 3, a support 10 comprising a guide body 11 is provided that has a first channel 12 configured to attach to a flange (not shown in FIG. 1, 2, or 3) at a predetermined measuring location and guide body 11 having a surface 14 configured to rest against the flange, and a second channel 16 having a surface or surfaces 18, 19, 20 configured to support a pin micrometer (not shown in FIG. 1, 2, or 3) in a stationary position to measure essentially perpendicular distances from the flange at the predetermined measuring location. In some configurations, first channel 12 is elongate along a first axis 22 and second channel 16 is arcuate and has an axis 24 perpendicular to first axis 22. Also in some configurations, a screw 26 is provided to hold the flange in first channel 12.

In some configurations of the present invention, guide body 11 is metallic, e.g., steel, aluminum, or some other suitable metal. In many configurations, screw 26 is a plastic or polyhexamethyleneadipamide, e.g., nylon, to avoid damaging the flange when it is tightened.

In some configurations, a third channel 28 is provided in guide body 11 with a surface or surfaces 30, 31, 32 configured to support a pin micrometer in a stationary position. Also, second channel 16 and third channel 28 comprise arcuate cuts 18 and 30 respectively in opposing faces 34 and 36 respectively of guide body 11, so that the micrometer can be supported in either second channel 16 or third channel 28 in accordance with the orientation in which guide body 11 is attached to the flange.

Figure 4:
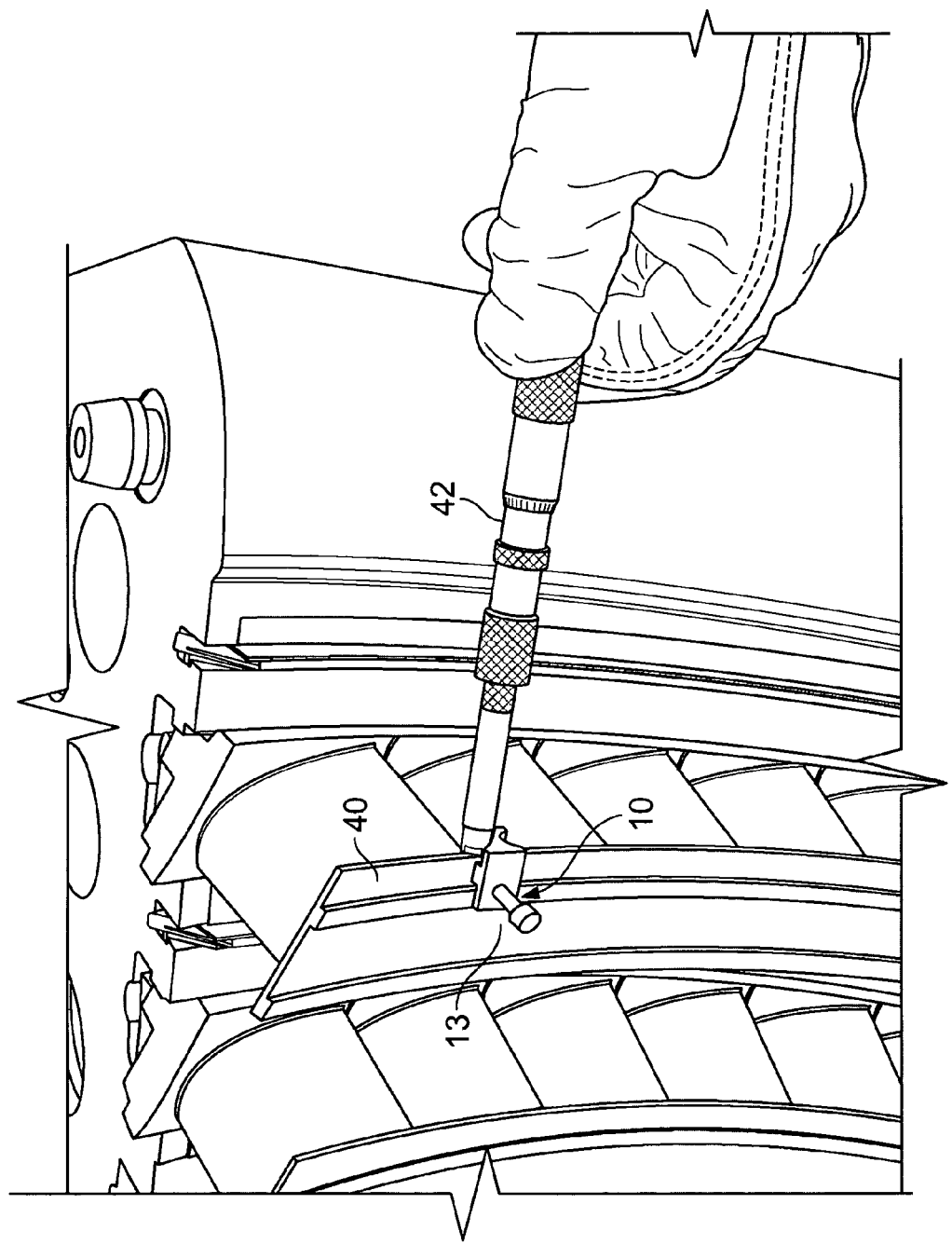
FIG. 4 is a pictorial view of a support attached to a flange and holding a pin micrometer.
Figure 5:
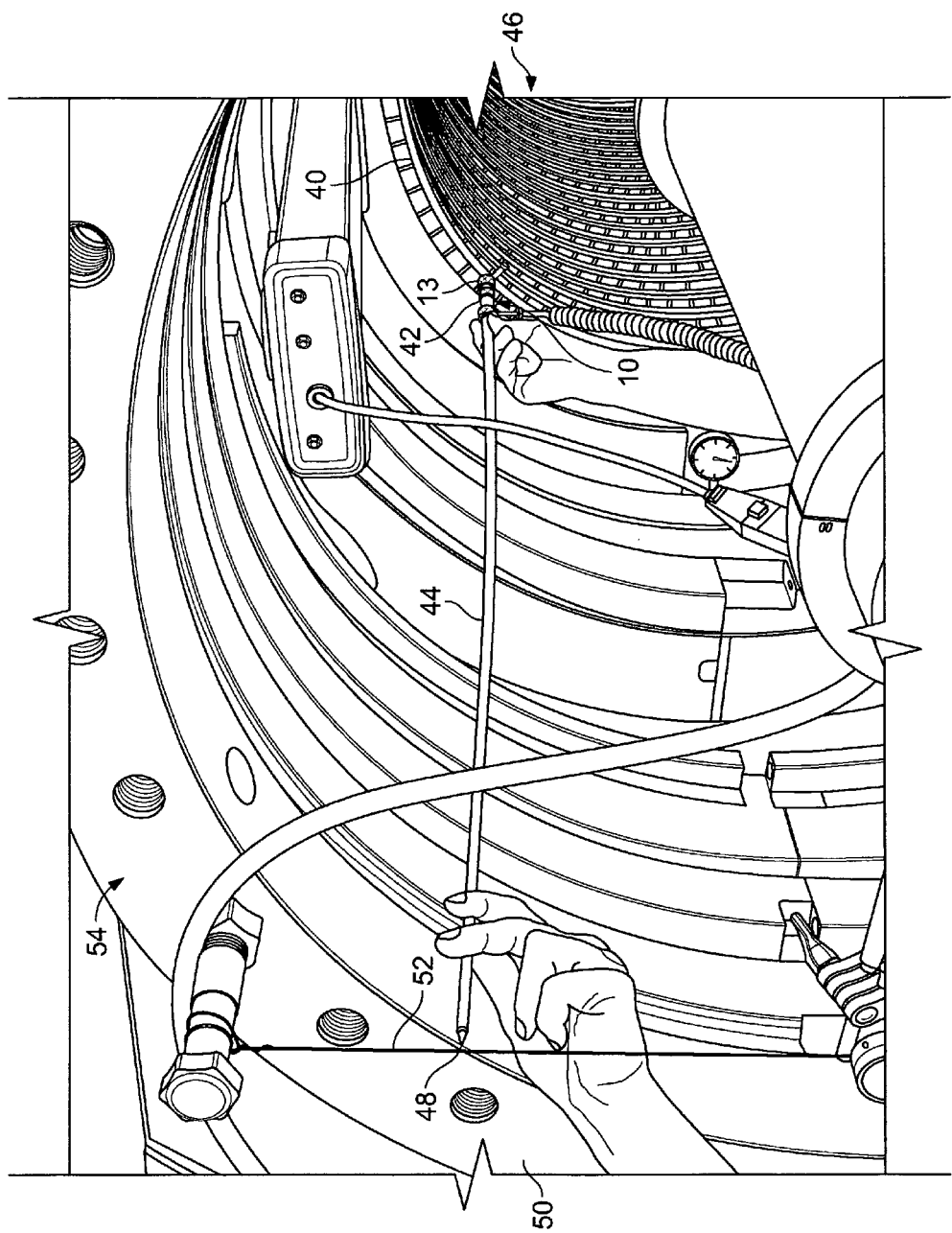
FIG. 5 is a pictorial view of a measurement being taken according to a method configuration of the present invention.

Support 10 is particularly useful in facilitating measurements of distances in difficult to reach places. For example, and referring to FIG. 4, support 10 is attached to a flange 40 at a predetermined location 13, and a pin micrometer 42 is supported in a stationary position in second channel 16. Referring now to FIG. 5, a measurement rod 44 of pin micrometer 42 to a location 48 to which the distance is to be measured. (Measurement rod 44 may comprise a set of rods with threaded male and female ends that can be joined together to obtain precise length increments.)

In some configurations of the present invention, the step of attaching guide body 11 to a flange 40 comprises utilizing screw 26 to hold guide body 11 to a diaphragm 40 of a turbine 46. For example, screw 26 is tightened to grasp flange or diaphragm 40 in first channel 12. In some configurations, screw 26 is plastic, for example, a nylon material, and guide body 11 is metallic.

Also, location 48 of the distance to be measured represents a distance to an end casing 50 of turbine 46. This distance can be represented by stretching a wire 52 taut across end casing 50, where location 48 is a point on stretched wire 52. Wire 52 can be a fixed distance from the end surface 54 of end casing 50. Predetermined location 13 in some configurations is marked, for example, by chalk.

Figure 6:
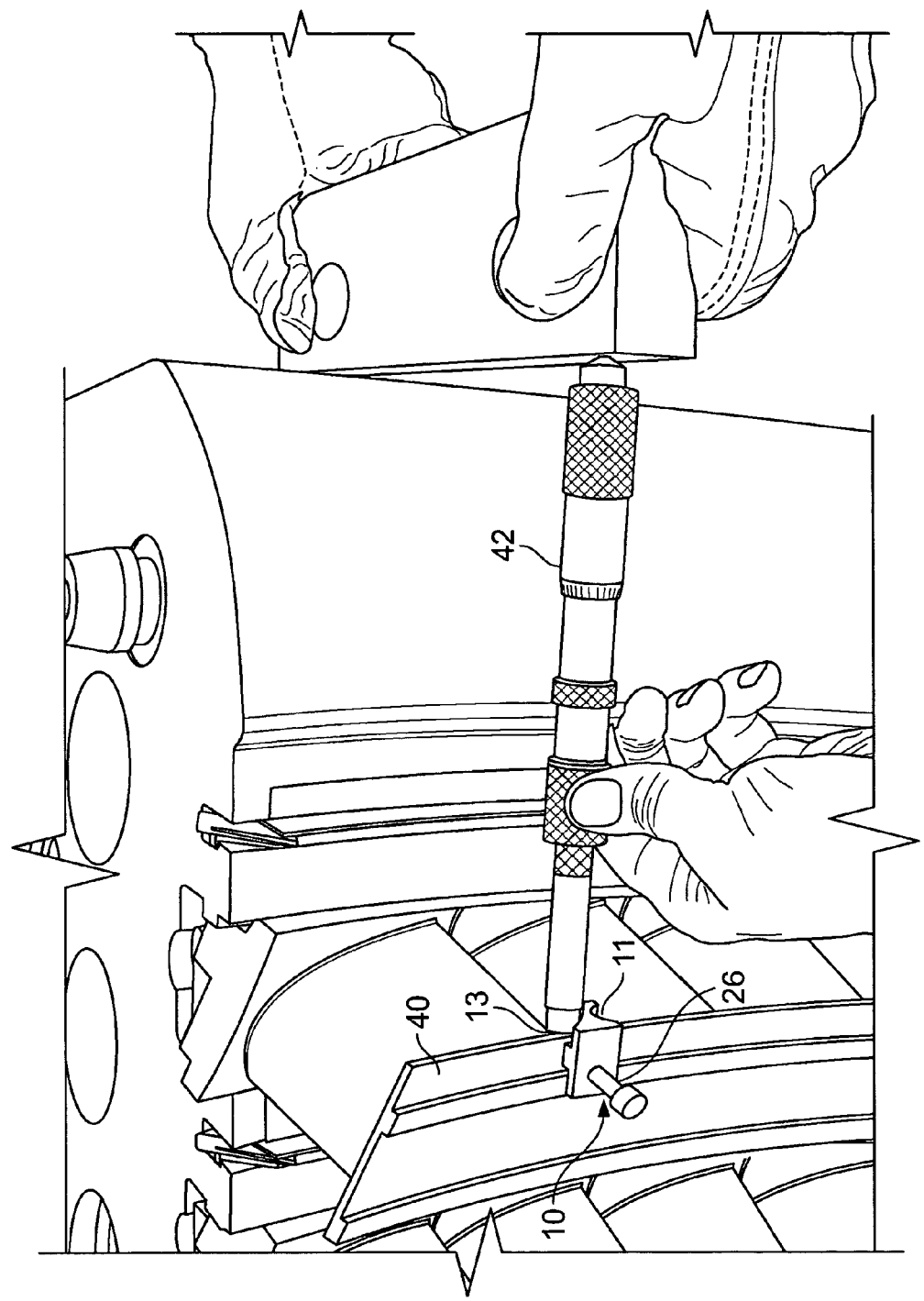
FIG. 6 is a pictorial view of the support of FIGS. 1, 2, and 3 holding a pin micrometer, showing how the pin micrometer is used.

FIG. 6 illustrates how pin micrometer 42 is used to take measurements. For this illustration, a block is held near pin micrometer 42 so that there is no need for a long measurement rod 44.

Measurement method configurations of the present invention provide a number of advantages over prior art measurement techniques. For example, in some prior art methods, two hands are required to support and hold pin micrometer 42 steady at a marked position of flange 40. In configurations of the present invention, only one hand is needed to support pin micrometer 42 at the marked position of flange 40. Furthermore, it has been determined that measurements made using method configurations of the present invention are more repeatable than those obtained using prior art methods, whether or not one or two hands are used in the prior art methods.

While the invention has been described in terms of various specific embodiments, those skilled in the art will recognize that the invention can be practiced with modification within the spirit and scope of the claims.

What is claimed is:

1. A support for a pin micrometer, said support comprising a guide body having a first channel configured to attach to a flange at a predetermined measuring location and having a surface configured to rest against the flange, and a second channel comprising a cradle brace configured to support a pin micrometer in a stationary position to measure essentially perpendicular distances from the flange at the predetermined measuring location.

2. A support in accordance with claim 1 wherein said first channel is elongate along a first axis and said second channel is arcuate and has an axis perpendicular to said first axis.

3. A support in accordance with claim 1 further comprising a screw to hold the flange in the first channel.

4. A support in accordance with claim 3 wherein said guide body is metallic.

5. A support in accordance with claim 4 wherein said screw is plastic.

6. A support in accordance with claim 5 wherein said screw is a nylon material.

7. A support in accordance with claim 1 having a third channel with a surface configured to support a pin micrometer in a stationary position to measure essentially perpendicular distances from the flange at the predetermined measuring location, wherein said second channel and said third channel each comprise arcuate cuts in opposing faces of said guide body, so that said micrometer can be supported in either said second channel or said third channel in accordance with an orientation in which said guide body is attached to the flange.

8. A method for measuring a distance with a pin micrometer, said method comprising:
   providing a support including a guide body having a first channel and a second channel;
   attaching the support to a flange at a predetermined location;
   supporting the pin micrometer in a stationary position within a cradle brace in the second channel; and
   extending a measurement rod of the pin micrometer to a location to which the distance is to enable substantially perpendicular distances from the flange to be measured at the predetermined location.

9. A method in accordance with claim 8 further comprising attaching a guide body to a flange utilizing a fastener to facilitate securing the guide body to a diaphragm of a turbine.

10. A method in accordance with claim 9 wherein the location of the distance to be measured represents a distance to an end casing of the turbine.

11. A method in accordance with claim 10 further comprising stretching a wire across the end casing and the location is a point on the stretched wire.

12. A method in accordance with claim 9 further comprises marking the predetermined location.

13. A method in accordance with claim 9 wherein the first channel is elongate along a first axis and said second channel is arcuate and has an axis perpendicular said first axis.

14. A method in accordance with claim 9 wherein said attaching a guide body further comprises tightening a screw to grasp the flange in the first channel.

15. A method in accordance with claim 14 wherein said attaching a guide body further comprises attaching a metallic guide body to the flange.

16. A method in accordance with claim 14 wherein said tightening a screw further comprises tightening a plastic screw.

17. A method in accordance with claim 14 wherein said tightening a plastic screw further comprises tightening a nylon screw.

* * * * *